(12) United States Patent
Wirola et al.

(10) Patent No.: US 8,368,589 B2
(45) Date of Patent: Feb. 5, 2013

(54) SUPPORTING A RELATIVE POSITIONING

(75) Inventors: Lauri Wirola, Tampere (FI); Jari Syrjarinne, Tampere (FI)

(73) Assignee: Nokia Corporation, Espoo (FI)

( * ) Notice: Subject to any disclaimer, the term of this patent is extended or adjusted under 35 U.S.C. 154(b) by 564 days.

(21) Appl. No.: 12/227,925

(22) PCT Filed: May 30, 2006

(86) PCT No.: PCT/IB2006/051714
§ 371 (c)(1),
(2), (4) Date: Jul. 13, 2009

(87) PCT Pub. No.: WO2007/138388
PCT Pub. Date: Dec. 6, 2007

(65) Prior Publication Data
US 2009/0303116 A1    Dec. 10, 2009

(51) Int. Cl.
*G01S 19/43* (2010.01)
(52) U.S. Cl. .................................. 342/357.26
(58) Field of Classification Search ............ 342/357.26, 342/357.24, 357.27, 357.41, 357.44
See application file for complete search history.

(56) References Cited

U.S. PATENT DOCUMENTS

| | | | |
|---|---|---|---|
| 5,903,236 A | 5/1999 | Lawrence | |
| 6,229,479 B1 | 5/2001 | Kozlov et al. | |
| 6,263,281 B1 | 7/2001 | Yamamoto et al. | |
| 7,151,950 B1 * | 12/2006 | Oyang et al. | 455/556.1 |
| 2004/0218895 A1 * | 11/2004 | Samadani et al. | 386/46 |
| 2005/0001763 A1 * | 1/2005 | Han et al. | 342/357.04 |
| 2005/0231423 A1 | 10/2005 | Han et al. | |
| 2009/0135057 A1 * | 5/2009 | Vollath et al. | 342/357.03 |

FOREIGN PATENT DOCUMENTS

| | | |
|---|---|---|
| JP | 2000304843 | 11/2000 |
| JP | 2002522793 | 7/2002 |
| JP | 2003535345 | 11/2003 |
| WO | WO 2006/043123 | 4/2006 |

OTHER PUBLICATIONS

Conventional PTK Positioning Technology and Multiple Base Station (Excellent Thesis of the First Chang San Jiao Forum, Digital Zone Construction and Geological Space Technology Tribune; Dec. 31, 2004; pp. 103-107 (English translation of Abstract and outline of the reference is attached).

* cited by examiner

*Primary Examiner* — Jack W Keith
*Assistant Examiner* — Fred H Mull
(74) *Attorney, Agent, or Firm* — Locke Lord LLP

(57) ABSTRACT

The invention relates to a method comprising receiving at least one set of data on satellite signals from at least one first GNSS receiver 22, each received set of data being associated to a particular instant of time. The method further comprises estimating data for at least one additional set of data associated to a respective additional instant of time based on the at least one received set of data. The method further comprises providing data from the at least one additional set of data in addition to data from the at least one received set of data for a determination of a position of at least one second GNSS receiver 12 relative to a position of the at least one first GNSS receiver 22.

18 Claims, 7 Drawing Sheets

SUPPORTING A RELATIVE POSITIONING

CROSS REFERENCE TO RELATED APPLICATIONS

This application is the U.S. National Stage of International Application Number PCT/IB2006/051714 filed on May 30, 2006 which was published in English on Dec. 6, 2007 under International Publication Number WO 2007/138388.

FIELD OF THE INVENTION

The invention relates to a method supporting a relative positioning of an assembly.

BACKGROUND OF THE INVENTION

A satellite based positioning of a device is supported by various Global Navigation Satellite Systems (GNSS). These include for example the American Global Positioning System (GPS), the Russian Global Navigation Satellite System (GLONASS), the future European system Galileo, the Space Based Augmentation Systems (SBAS), the Japanese GPS augmentation Quasi-Zenith Satellite System (QZSS), the Locals Area Augmentation Systems (LAAS), and hybrid systems.

The constellation in GPS, for example, consists of more than 20 satellites that orbit the earth. Each of the satellites transmits two carrier signals L1 and L2. One of these carrier signals L1 is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo random noise (PRN) code, which is spreading the spectrum over a 1 MHz bandwidth. It is repeated every 1023 bits, the epoch of the code being 1 ms. The carrier frequency of the L1 signal is further modulated with navigation information at a bit rate of 50 bit/s. The navigation information comprises inter alia ephemeris and almanac parameters. Ephemeris parameters describe short sections of the orbit of the respective satellite. Based on these ephemeris parameters, an algorithm can estimate the position of the satellite for any time while the satellite is in the respective described section. The almanac parameters are similar, but coarser orbit parameters, which are valid for a longer time than the ephemeris parameters. The navigation information further comprises for example clock models that relate the satellite time to the system time of GPS and the system time to the Coordinated Universal Time (UTC).

A GPS receiver of which the position is to be determined receives the signals transmitted by the currently available satellites, and it detects and tracks the channels used by different satellites based on the different comprised C/A codes. Then, the receiver determines the time of transmission of the code transmitted by each satellite, usually based on data in the decoded navigation messages and on counts of epochs and chips of the C/A codes. The time of transmission and the measured time of arrival of a signal at the receiver allow determining the pseudorange between the satellite and the receiver. The term pseudorange denotes the geometric distance between the satellite and the receiver, which distance is biased by unknown satellite and receiver offsets from the GPS system time.

In one possible solution scheme, the offset between the satellite and system clocks is assumed known and the problem reduces to solving a non-linear set of equations of four unknowns (3 receiver position coordinates and the offset between the receiver and GPS system clocks). Therefore, at least 4 measurements are required in order to be able to solve the set of equations. The outcome of the process is the receiver position.

Similarly, it is the general idea of GNSS positioning to receive satellite signals at a receiver which is to be positioned, to measure the time it took the signals to propagate from the satellite to the receiver, to deduce therefrom the pseudorange between the receiver and the respective satellite and further the current position of the receiver, making use in addition of estimated positions of the satellites. Usually, a PRN signal which has been used for modulating a carrier signal is evaluated for positioning, as described above for GPS.

In a further approach known as Real Time Kinematics (RTK), the carrier phases measured at two GNSS receivers are evaluated for determining the distance and attitude between the two receivers very accurately, typically at cm- or even mm-level accuracy. The combination of the distance and attitude between two receivers is also referred to as baseline. The carrier phase measurements that are performed at GNSS receivers for a RTK positioning may be exchanged in real-time or be stored for a later exchange known as post-processing. Usually, one of the GNSS receivers is arranged at a known location and called reference receiver, while the other receiver is to be positioned with respect to the reference receiver and called user receiver or rover. The determined relative position can further be converted into an absolute position, if the location of the reference position is accurately known. However, the RTK calculations actually require that the positions of both receivers are known at least approximately. These positions can be obtained from determined pseudoranges.

A satellite signal is distorted on its way from a satellite to a receiver due to, for instance, multipath propagation and due to influences by ionosphere and troposphere. Moreover, the satellite signal has a bias due to the satellite clock bias and its carrier phase has unknown initial phase. When the satellite signal is measured in the receiver, it is further distorted. The signal measurement contains, in addition to previous errors, errors due to, for instance, receiver noise and receiver time bias. In traditional RTK, all or most of these errors are assumed to correlate between the receivers and satellites, in which case the errors vanish in double differencing.

The relative positioning may thus be based more specifically on signal measurements at two GNSS receivers, which are used to form double difference observables. Such signal measurements may include for example carrier phase measurements and PRN code measurements, etc. A double difference observable relating to the carrier phase is the difference in the carrier phase of a specific satellite signal at both receivers compared to the difference in the carrier phase of another satellite signal at both receivers. A double difference observable relating to the PRN code is obtained correspondingly. The double difference observables can then be employed for determining the position of the receivers relative to each other at high accuracy.

A relative positioning of GNSS receivers making use of double difference observables has been described for example in U.S. Pat. No. 6,229,479 B1.

With a standard GNSS positioning, two GNSS receivers are able to determine their location, and therefore the baseline between them, with an accuracy of 5 to 20 meters. Compared to such a standard GNSS positioning, it is an advantage of the RTK approach that it allows determining the baseline with a much higher accuracy of 0.1 to 10 cm. It is noteworthy that this accuracy can be achieved with standard commercial GNSS-receivers.

Originally, RTK has only been available for geodesic surveying and other applications requiring a high accuracy. The equipment required for such applications is expensive and meant, therefore, only for professional use. However, it is also possible to obtain a high-precision baseline using two low-cost GNSS-enabled handsets, for example terminals with integrated GNSS-receiver or terminals equipped with an external Bluetooth GNSS-receiver. The data between the terminals can be exchanged using any kind of data transfer technology, like general packet radio service (GPRS), wireless local area networks (WLAN) or Bluetooth™. This allows the baseline to be determined and updated in real-time, while in many conventional solutions, the baseline is determined off-line. This approach is also called mobile Real-Time Kinematics (mRTK), indicating that mobile technology is used to expand the RTK use cases and bring the benefits of the technology to a wider audience.

Whenever a baseline between a user receiver and a reference receiver is to be updated using mRTK, some information on signal measurements has to be exchanged between the receivers. For example, if the positioning calculations are carried out at a user receiver, the user receiver has to obtain results of signal measurements from the reference receiver. The required signal measurements may comprise, but are not limited to, in particular a pseudorange value, a carrier phase value, a Doppler frequency, a carrier phase polarity and cycle slip information for each received GNSS signal. In addition, time and position information is needed, which is common to all the measured signals. The amount of the required measurement information is thus considerable and consequently, also the bandwidth required for data relay is substantial.

The required bandwidth is in particular an issue, when a high update frequency is to be used in a positioning.

The typical update frequency is 1 Hz, but in high-precision applications, such as moving particle trajectory determination or writing, a higher update frequency is required.

The effect of the update frequency on an RTK positioning is illustrated in FIG. 1. A terminal including a user receiver moves on a circular trajectory that is indicated in FIG. 1 with a solid line 1. The terminal is circling the origin with a period of 5 seconds. A dotted line 2 connects the five positions 3 that are determined with the typical update frequency of 1 Hz. It can be seen that this trajectory deviates significantly from the true circular trajectory 1. If the update frequency is increased tenfold to 10 Hz, the true trajectory is captured very well when connecting the determined positions, indicated as dots 4 in FIG. 1. However, conventionally, this means that a reference receiver has to send the result of signal measurements to the terminal at 10-fold frequency. This also increases the amount of transmitted data and thus the required bandwidth by ten.

This is often not acceptable, because in many applications in which a high baseline update-frequency is desired, the required bandwidth is not available or a cost issue.

SUMMARY OF THE INVENTION

It is an object of the invention to enable a high update-frequency of a relative positioning without increasing the bandwidth that is required for exchanging measurement data.

A method is proposed, which comprises receiving at least one set of data on satellite signals from at least one first GNSS receiver, each received set of data being associated to a particular instant of time. The method further comprises estimating data for at least one additional set of data associated to a respective additional instant of time based on the at least one received set of data. The method further comprises providing data from the at least one additional set of data in addition to data from the at least one received set of data for a determination of a position of at least one second GNSS receiver relative to a position of the at least one first GNSS receiver.

Moreover, an apparatus is proposed, which comprises a processing component. The processing component is arranged to receive at least one set of data on satellite signals from at least one first GNSS receiver, each received set of data being associated to a particular instant of time. The processing component is further configured to estimate data for at least one additional set of data associated to a respective additional instant of time based on the at least one received set of data. The processing component is further configured to provide data from the at least one additional set of data in addition to data from the at least one received set of data for a determination of a position of at least one second GNSS receiver relative to a position of the at least one first GNSS receiver.

The processing component can be implemented in hardware and/or software. It may be for instance a processor executing software program code for realizing the required functions. Alternatively, it could be for instance a circuit that is designed to realize the required functions, for instance implemented in a chipset or a chip, like an integrated circuit.

The apparatus can be for example identical to the processing component, but it may also comprise additional components.

For instance, the apparatus could be or belong to a module, which comprises in addition a GNSS receiver adapted to receive signals from at least one satellite. Such a module could be provided for integration in some device, like a GNSS device or a wireless communication device. Further, the apparatus could be or belong to a GNSS device, which comprises in addition a GNSS receiver adapted to receive signals from at least one satellite. Further, the apparatus could be or belong to a wireless communication device, which comprises in addition a wireless communication component configured to receive measurement results on satellite signals from the at least one first global navigation satellite system receiver.

Moreover, an assembly is proposed, which comprises the proposed apparatus. In addition, the assembly comprises a GNSS receiver adapted to receive signals from at least one satellite. This GNSS receiver may correspond to the above mentioned second GNSS receiver. In addition, the assembly comprises a wireless communication component configured to receive measurement results on satellite signals from the at least one first GNSS receiver.

The assembly can be a single device in which the apparatus, the GNSS receiver and the wireless communication component are integrated, or it may be realized as separate devices, to which the apparatus, the GNSS receiver and the wireless communication component are distributed. For example, the GNSS receiver may be attached as an accessory device to the wireless communication component, while the proposed apparatus may be integrated into GNSS receiver or wireless communication component. The attachment can be realized with any suitable data link, for example a fixed cable, a Bluetooth™ link, an UWB link or an Infrared link.

The wireless communication component can be for instance a cellular engine or terminal, or a WLAN engine or terminal, etc. A cellular terminal can be a cellular phone or any other type of cellular terminal, like a laptop, which comprises means for establishing a link via a cellular network.

Moreover, a server is proposed, which comprises the proposed apparatus. In addition, the server comprises a wireless communication component configured to receive measurement results on satellite signals from the at least one first GNSS receiver and the at least one second GNSS receiver.

Moreover, a system is proposed, which comprises the proposed apparatus. In addition, the system comprises the at least one first GNSS receiver.

Moreover, a software program code is proposed. When being executed by a processor, the software program code realizes the steps of the proposed method.

Finally, a software program product is proposed, in which the proposed software program code is stored in a computer readable medium. This program product may be for instance a separate memory device or a component that is to be integrated in a larger device.

The invention is based on the consideration that a device receiving data on satellite signals from another device at a low rate in order to maintain a low bandwidth could generate additional data for obtaining a finer temporal spacing. It is therefore proposed that such additional data is estimated based on received data for additional instants of time. Such additional instants of time may lie before or after the last instant of time for which a set of data on satellite signals from at least one first GNSS receiver is received.

It is an advantage of the invention that high-precision trajectories may be measured without an increased bandwidth requirement. It is also an advantage of the invention that transferring a smaller amount of data also implies reduced costs.

It is to be understood that an additional set of data may include less values than a received set of data. Further, it is to be understood that only at least one of the data items in an additional set of data has to be an estimate. Some of the data in an additional set of data may also be identical to data in a received set of data.

It is possible to estimate data for an additional set of data in several ways.

In one embodiment of the invention, estimating data for at least one additional set of data comprises extrapolating selected data from the at least one received set of data. Data from received sets of data can be extrapolated to future instants of time but equally to earlier instants of time. If an extrapolation is used for predicting data for future instants of time, a relative position may still be updated in real-time.

In another embodiment of the invention, estimating data for at least one additional set of data comprises interpolating selected data from at least two received sets of data. In this embodiment, received data sets are thus used to generate additional artificial measurement instants between the actual measurement instants.

If an interpolation is used for estimating additional data, a relative position can only be updated in near real-time, since the additional data is generated for earlier instants of time than the instant associated to the latest set of data. Still, the delay is only in the order of the interval length in which sets of data are received, for example one second in the case sets of data are received with a frequency of 1 Hz.

For both, interpolation and extrapolation, the selected data may comprise a value that is related to a carrier phase of a satellite signal and/or a value that is related to a pseudorange, that is, the rough estimate of a range between a satellite and a receiver at the time at which a satellite signal is transmitted. It is to be understood, however, that other types of data could be selected as well for interpolation or extrapolation, like measurements on the PRN code of a satellite signal, etc. Some future systems or signals could even provide suitable types of data that are not usable with current systems, like secondary spread code measurements on received satellite signals. Additional data in the received set of data and/or the additional set of data could include information on a Doppler frequency, on a carrier phase polarity and on a cycle slip. Moreover, some uncertainty indication could be associated in the sets of data with each measurement value, typically variance or standard deviation. Further, the sets of data could include position information, position uncertainty information and time information.

Various other types of information could be included as well, for example information indicating whether the first GNSS receiver is stationary or not. If the first GNSS receiver is a mobile device, this information may originate, for instance, from inertial sensors at the first GNSS receiver.

An estimation of data may be based exclusively on selected data in the received set of data. In addition, however, other type of data from the received set of data could be taken into account. Both, extrapolation and interpolation of selected data may take into account, for example, a rate of change of the selected data. The rate of change may be determined from a value from one or more received sets of data that is related to a Doppler frequency, but it could also be determined from some other value from one or more received sets of data.

The first and/or the second GNSS receiver could be associated for instance to a handset, to a base station or to a virtual reference station (VRS), either as an integrated component or as an accessory as mentioned further above.

The at least one first GNSS receiver could be for example a stationary GNSS receiver. If the first GNSS receiver belongs for example to a base station, which clearly has a stationary character, the base station loading is significantly reduced if the data sending interval can be dropped to, for instance, one-tenth of the value that would be required without the invention. The at least one first GNSS receiver could also be a mobile GNSS receiver, though, that may or may not be kept at a fixed location during the positioning. A fixed location of the first GNSS receiver ensures a higher reliability of the estimated data than a varying location.

The at least one second GNSS receiver could be a mobile GNSS receiver, which may belong to an assembly according to the invention. Such an assembly could also estimate the data for the at least one additional set of data. It is to be understood that in case the second GNSS receiver and other parts of the assembly are linked to each other wirelessly or by means of a relatively long cable, the second GNSS receiver could also be moved while keeping the rest of the assembly at a fixed location.

An assembly performing the estimation may determine own sets of data based on satellite signals received by its GNSS receiver. Own sets of data comprises data that is obtained from measurements on received satellite signals, possibly after some computations as in the case of a pseudorange.

Own sets of data may be determined for example at a rate, which corresponds to a rate of received sets of data in combination with all additional sets of data. If the assembly itself performs the data estimation, this is possible, since the own measurements are not transmitted and do thus not occupy any bandwidth. Alternatively, however, the own sets of data may also be determined for example at a rate, which corresponds to a rate at which sets of data are received from the first GNSS receiver. In this case, the assembly may further generate at least one additional set of data based on at least one own set of data. This ensures, for example, that a GNSS receiver may determine a set of data always with the same rate, regardless of whether it is employed as a user receiver or as a reference receiver.

It is to be understood that the above described constellations of first and second GNSS receivers serve only as examples. Alternatively, for example, the first GNSS receiver could also be a mobile assembly and the second GNSS receiver could be a stationary or fixed GNSS receiver. In this case, the estimation could also be performed at an assembly according to the invention comprising the stationary or fixed GNSS receiver. Further, the estimation could be performed at a third entity, for instance at some server, which receives sets of data from both first and second GNSS receiver.

The invention can be employed in particular, though not exclusively, in high-precision navigation and surveying applications. It can be provided for professional use, but also for fun applications, such as writing with a GNSS receiver.

It can further be used with any kind of GNSS, like GPS, GLONASS, GALILEO, SBAS, QZSS, LAAS or a combination of these. LAAS has the advantage that it enables the use of mRTK under indoor conditions as well.

BRIEF DESCRIPTION OF THE FIGURES

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 2:
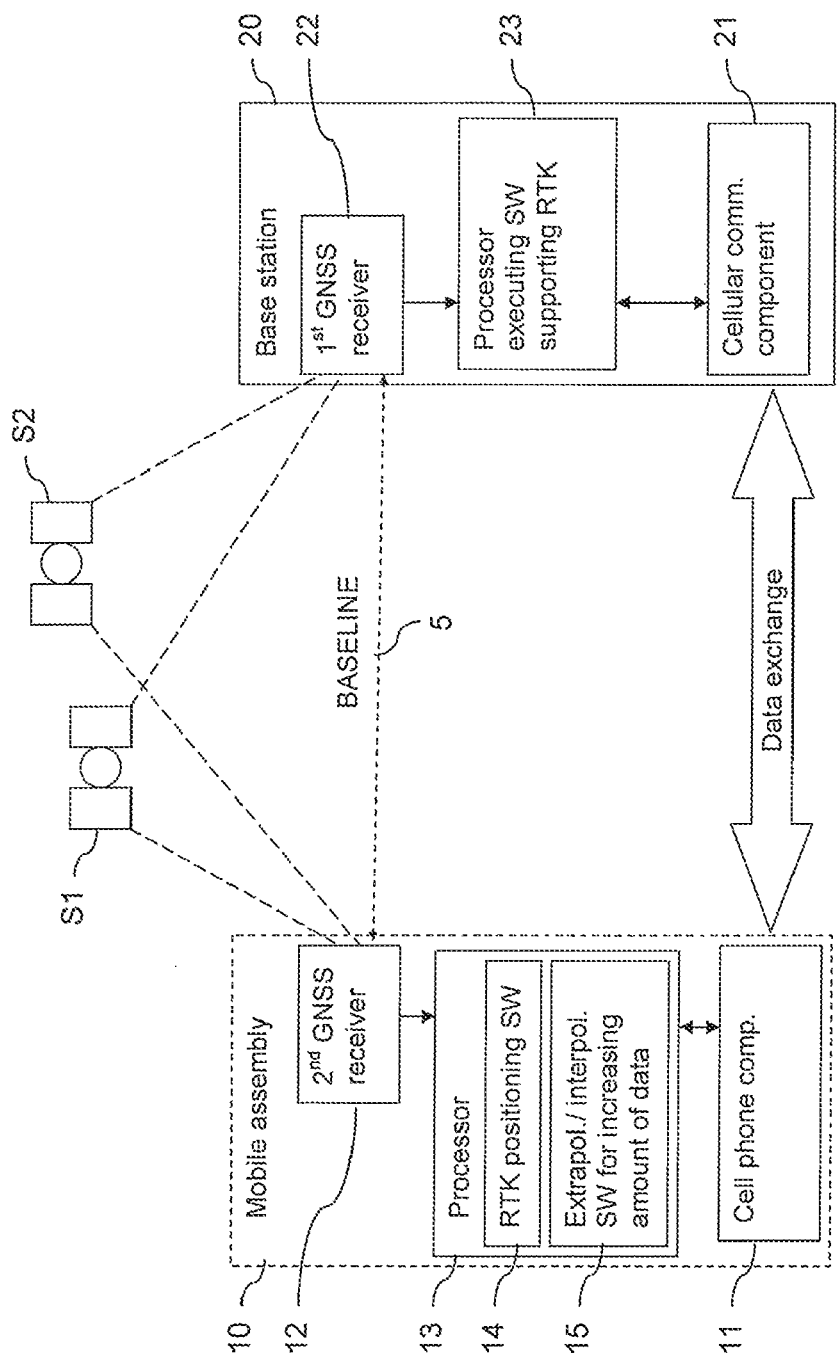
FIG. 2 is a schematic diagram of a system according to an embodiment of the invention.

FIG. 2 presents an exemplary system according to the invention, which allows tracking a movement with a high precision using a low bandwidth.

The system comprises a mobile assembly 10 and a base station 20.

The mobile assembly 10 includes a cellular phone component 11 and a GNSS receiver 12. The GNSS receiver 12 is used here as a user receiver in an RTK positioning. It is an example for the second GNSS receiver according to the invention. The mobile assembly 10 further comprises a processor 13, which is configured to execute implemented software program code. The implemented software program code includes a mobile RTK positioning software program code 14 and an extrapolation or interpolation software program code 15.

The processor 13 executing software program code 15 is an exemplary processing component of the invention. It has to be noted that the processor 13 does not have to be a separate component; it may as well belong to the GNSS receiver 12 or to the cellular phone component 11. Moreover, an integrated circuit could be used as an alternative to a processor 13 for realizing the functions of the processor 13. Alternatively, it could be given for instance by a cellular phone component comprising the processor 13 and some storage component (not shown) storing the software program codes 14, 15.

The mobile assembly 10 can further be for instance a single device with all depicted components 11, 12, 13 integrated in one casing. Alternatively, it could also comprise for instance a cellular phone 11, 13 which is linked detachably to a separate GNSS receiver 12, for example using a wired connection or a Bluetooth™ connection.

The base station 20 includes a cellular communication component 21 and a GNSS receiver 22. The GNSS receiver 22 is used here as a reference receiver in a mobile RTK positioning. It is an example for the first GNSS receiver according to the invention. The base station 20 may further comprise a processor 23, which is configured to execute implemented software program code. The implemented software program code may include a software program code supporting an RTK positioning. This support may simply consist in taking care that measurement results of the GNSS receiver 22 are forwarded to the mobile assembly 10. Only in few cases, an mRTK positioning software would be implemented in the base station 20.

The cellular phone component 11 of the mobile assembly 10 and the cellular communication component 21 of the base station 20 are able to communicate with each other using a cellular link or a non-cellular link, like a wireless LAN connection, a Bluetooth™ connection, a UWB connection or an infrared connection. The employed communication channel may also be a control plane channel or a secure user plane location (SUPL) channel. Moreover, the employed message format may also be standardized, for example for use in the global system for mobile communications (GSM), in the universal mobile telecommunications system (UMTS) and/or in a code division multiple access (CDMA) system, etc.

An operation in the system of FIG. 2 will now be described in more detail with reference to the flow chart of FIG. 3. The operation of the mobile assembly 10 is presented on the left hand side of FIG. 3. The operation of the base station 20 is presented on the right hand side of FIG. 3.

It is assumed that the position of the mobile assembly 10 is to be tracked, either relative to the position of the base station 20 or absolutely. The distance between the GNSS receivers 12 and 22 representing this relative position is indicated in FIG. 2 by a dashed baseline 5.

The GNSS receivers 12, 22 of the mobile assembly 10 and of the base station 20 both operate as normal GNSS receivers. That is, they are configured to receive, acquire, track and decode signals transmitted by satellites S1, S2 belonging to one or more GNSSs, like GPS and Galileo. Further, the GNSS receivers 12, 22 are able to compute a stand-alone position in a known manner based on the received satellite signals.

For a particular application, however, the position of the mobile assembly might have to be tracked with a high-precision. To this end, an enhanced mobile RTK positioning is employed.

Using software program code 14, the processor 13 of the mobile assembly 10 first generates an initialization request, which is transmitted by the cellular phone component 11 to the base station 20 (step 111). The request is received by the cellular communication component 21 of the base station 20 and provided to the processor 23 (step 121).

When an initialization request is transmitted, the GNSS receiver 12 of the mobile assembly 10 performs measurements on received satellite signals with the usual frequency of 1 Hz or with an increased frequency of e.g. 10 Hz (step 112). The GNSS receiver 12 provides for each measurement instant a set of data resulting in the measurements to the processor 13.

Upon receipt of the initialization request, the GNSS receiver 22 of the base station 20 performs measurements on received satellite signals with the usual frequency of 1 Hz (step 122). The GNSS receiver 22 provides for each measurement instant a set of data resulting in the measurements to the processor 23.

In both cases, a set of data includes for a respective instant $t_k$ at least the carrier phase value of a received satellite signal $\phi(t_k)$, the pseudorange value to the transmitting satellite $\rho(t_k)$, the Doppler frequency $f_{DOPPLER}(t_k)$, the carrier phase polarity $P \in \{0,1\}$ and cycle slip indication information. It has to be noted that in an alternative set of data, direct code phase measurements or some other undefined data type could be used instead of a pseudorange value. Each set of data may further include information on the position of the respective GNSS receiver 12, 22, on position uncertainty, on carrier phase variance or standard deviation and on pseudorange variance or standard deviation, etc.

A respective set of data is determined by the GNSS receiver 12 and the GNSS receiver 22 for signals from at least two different satellites S1, S2.

The processor 23 of the base station 20 sends the sets of data via the cellular communication component 21 to the mobile assembly 10 (step 123). The cellular phone component 11 of the mobile assembly 10 receives the sets of data and forwards them to the processor 13 (step 113).

The data that is determined by GNSS receiver 12 and by GNSS receiver 22 has to be aligned. That is, the measurements have to be carried out at the same instant of time. If this is not possible, then the data resulting from measurements at a specific instant at one of the receivers must be extrapolated or interpolated, in order to be synchronized with the data resulting from measurements at the other receiver. It is assumed for the present embodiment that simultaneous measurements are enabled.

Using software program code 15, the processor 13 now increases the number of carrier phase and pseudorange values received from the base station 20 to correspond to a measurement rate of 10 Hz instead of the employed 1 Hz (step 114).

The additional carrier phase and pseudorange values can be obtained for example by extrapolation or interpolation of received values.

For an extrapolation, the processor 13 considers the data from a single received data set. From such a data set, it has to know the carrier phase value $\phi(t_k)$ and its rate-of-change, namely the Doppler frequency $f_{DOPPLER}(t_k)$ at a measurement instant $t_k$. Further, it has to know the pseudorange value $\rho(t_k)$ and its rate-of-change, namely the velocity $v_{DOPPLER}(t_k)$ at a measurement instant $t_k$. The velocity can be determined from the Doppler frequency $f_{DOPPLER}(t_k)$ and the signal wavelength $\lambda$ to $v_{DOPPLER}(t_k) = \lambda \cdot f_{DOPPLER}(t_k)$. Further, the processor 13 needs the carrier phase polarity P. If all this information is available, the carrier phase and pseudorange values for a later instant $t_k + \Delta t$ can be predicted by linear extrapolation to be:

$$\phi(t_k + \Delta t) = \phi(t_k) + f_{DOPPLER}(t_k) \cdot \Delta t + \frac{1}{2} \cdot P$$

$$\rho(t_k + \Delta t) = \rho(t_k) + v_{DOPPLER}(t_k) \cdot \Delta t$$

In order to increase the number of carrier phase values and pseudorange values by ten, nine extrapolations have to be carried out for each received set of data. For each received set of data, $\Delta t$ may thus increase in the above equations from one extrapolation to the next from 0.1 s to 0.9 s in steps of 0.1 s.

It is to be understood that various other types of extrapolation could be used as well, not only the presented linear extrapolation. One alternative comprises, for instance, performing a polynomial fit based on a few last measurements.

For an interpolation, the processor 13 requires data from two received subsequent data sets, which are associated to two distinct measurement instants, $t_k$ and $t_{k+1}$. The required data may include for each instant a carrier phase value $\phi(t_k)$, $\phi(t_{k+1})$ and its rate of change $f_{DOPPLER}(t_k)$, $f_{DOPPLER}(t_{k+1})$, and the pseudorange value $\rho(t_k)$, $\rho(t_{k+1})$ and its rate-of-change $v_{DOPPLER}(t_k)$, $v_{DOPPLER}(t_{k+1})$.

Additional carrier phase values and additional pseudorange values in the interval $t \in [t_k, t_{k+1}]$ may then be determined based on the following equations:

$$\phi(t) = A_\phi + B_\phi \cdot t + C_\phi \cdot t^2$$

$$\rho(t) = A_\rho + B_\rho \cdot t + C_\rho \cdot t^2$$

The required coefficients $A_\phi$, $B_\phi$, $C_\phi$, $A_\rho$, $B_\rho$, $C_\rho$ can be determined according to the equation:

$$\begin{bmatrix} \phi(t_k) \\ f_{DOPPLER}(t_k) \\ \phi(t_{k+1}) \\ f_{DOPPLER}(t_{k+1}) \\ \rho(t_k) \\ v_{DOPPLER}(t_k) \\ \rho(t_{k+1}) \\ v_{DOPPLER}(t_{k+1}) \end{bmatrix} = \begin{bmatrix} 1 & t_k & t_k^2 & 0 & 0 & 0 \\ 0 & 1 & 2 \cdot t_k & 0 & 0 & 0 \\ 1 & t_{k+1} & t_{k+1}^2 & 0 & 0 & 0 \\ 0 & 1 & 2 \cdot t_{k+1} & 0 & 0 & 0 \\ 0 & 0 & 0 & 1 & t_k & t_k^2 \\ 0 & 0 & 0 & 0 & 1 & 2 \cdot t_k \\ 0 & 0 & 0 & 1 & t_{k+1} & t_{k+1}^2 \\ 0 & 0 & 0 & 0 & 1 & 2 \cdot t_{k+1} \end{bmatrix} \begin{bmatrix} A_\phi \\ B_\phi \\ C_\phi \\ A_\rho \\ B_\rho \\ C_\rho \end{bmatrix}$$

This linear system may be solved by the well known least-squares method (LSM).

Alternatively, if no first order derivative Doppler information is available in the received sets of data, the interpolation can be carried out using only the carrier phases $\phi(t_k)$, $\phi(t_{k+1})$ and the pseudoranges $\rho(t_k)$, $\rho(t_{k+1})$ according to the following equations:

$$\phi(t) = A_\phi + B_\phi \cdot t$$

$$\rho(t) = A_\rho + B_\rho \cdot t$$

The system for determining the required coefficients $A_\phi$, $B_\phi$, $A_\rho$, $B_\rho$ is then reduced to:

$$\begin{bmatrix} \phi(t_k) \\ \phi(t_{k+1}) \\ \rho(t_k) \\ \rho(t_{k+1}) \end{bmatrix} = \begin{bmatrix} 1 & t_k & 0 & 0 \\ 1 & t_{k+1} & 0 & 0 \\ 0 & 0 & 1 & t_k \\ 0 & 0 & 1 & t_{k+1} \end{bmatrix} \begin{bmatrix} A_\phi \\ B_\phi \\ A_\rho \\ B_\rho \end{bmatrix}$$

with $$C_\phi = C_\rho = 0$$

This linear system may equally be solved by the least-squares method (LSM).

It is to be understood that various other types of interpolation could be used as well, not only the presented interpolations using $1^{st}$ and $2^{nd}$ order polynomials.

In order to increase the received number of carrier phase values and pseudorange values by ten, nine interpolations have to be carried out based on respectively two subsequent sets of data. For each pair of the received sets of data, t may thus be increased in the above equations from one interpolation to the next from $t_k+0.1$ s to $t_k+0.9$ s in steps of 0.1 s. It has to be noted that the second set of data in a pair of data sets is used as the first set of data for the next pair of data sets.

Additional sets of data associated to instants of time $t_k+1.0$ s to $t_k+0.9$ s are then assembled using the estimated carrier phase value and the estimated pseudorange value for the respective time instant and in addition the Doppler frequency and the polarity from the received data set associated to instant of time $t_k$.

In case the GNSS receiver 12 uses an increased measurement rate of 10 Hz, sufficient sets of data are available for the site of the mobile arrangement 10. A high measurement rate can be used by the GNSS receiver 12, because the corresponding sets of data do not have to be transmitted. They are only processed in the mobile assembly 10 itself. If the GNSS receiver 12 uses the typical measurement rate of 1 Hz as well, in contrast, the number of own data sets provided by the GNSS receiver 12 has to be increased in the same manner as the number of data sets that are received from the base station 20 (step 115).

The available amount of data is increased as described with reference to steps 114 and 115 for each satellite S1, S2 for which signal measurements are carried out by the GNSS receivers 12, 22.

All received data sets, all own data sets and all additional data sets are provided for use in mobile RTK calculation.

Using software program code 14, the processor 13 may then continue with a conventional or mobile RTK positioning based on the increased amount of data for tracking the position of the GNSS receiver 12 of the mobile assembly 10 (step 116). The determined relative position compared to the GNSS receiver 22 of the base station 20 can be converted into an absolute position, if the accurate position of the base station 20 is known and provided to the mobile assembly 10.

The determined relative or absolute position of the GNSS receiver 12 of the mobile assembly 10 may then be used by an application of the mobile assembly 10 or be transmitted to the base station 20 (step 117), which receives the information (step 124) and provides it to some application, for instance to a location service application of some location service server.

Figure 3:
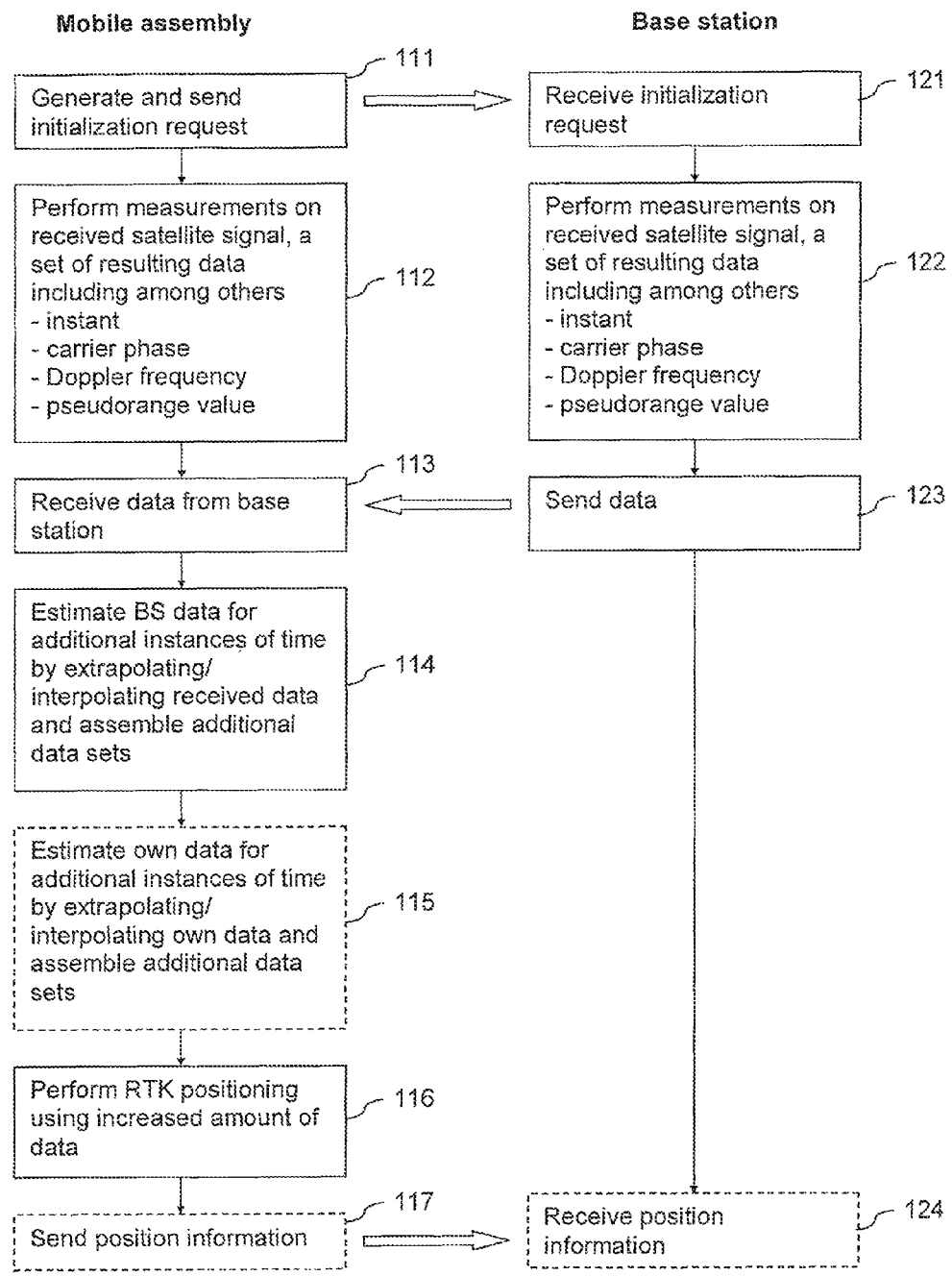
FIG. 3 is a flow chart illustrating an operation in the system of FIG. 1 according to an embodiment of the invention.

The optional character of steps 115, 117 and 124 is indicated in FIG. 3 by dashed lines.

It is to be understood that the frequencies of 1 Hz and 10 Hz are only indicated by way of example. The invention can be used with any other frequency values as well.

It is further to be understood that the positioning could also be expanded to more than two GNSS receivers. In addition, signals originating from the same satellite but using different frequencies could be evaluated, in order to reduce the effort for a possible integer ambiguity resolution. Further, signals from another number than two satellites could be evaluated.

The GNSS receiver 12 or the software program code 14 could also be designed to use assistance data from an external source for any satellite signal acquisition and processing.

Figure 4:
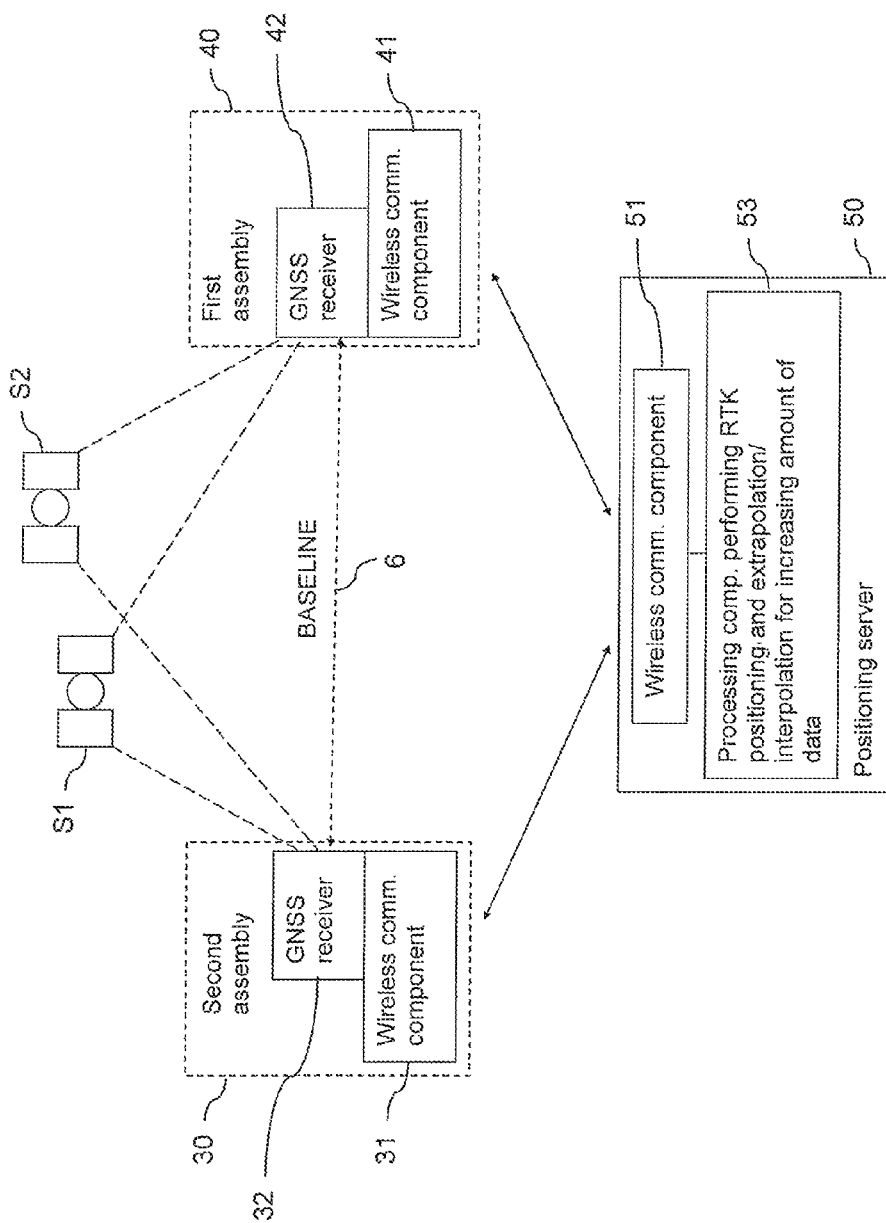
FIG. 4 is a schematic diagram of a system according to a further embodiment of the invention.

FIG. 4 presents another exemplary system according to the invention, which allows determining a relative position with a high precision using a low bandwidth.

This system comprises a first mobile assembly 40, a second mobile assembly 30 and a positioning server 50.

Both mobile assemblies 30, 40 include a wireless communication component 31, 41 and a GNSS receiver 32, 42. The wireless communication component 31, 41 enables at least one type of wireless connection to some other wireless communication component. The GNSS receivers 32, 42 are able to receive signals which are transmitted by satellites S1, S2 belonging to one or more GNSSs. They are separated from each other by baseline 6.

The positioning server 50 includes as well a wireless communication component 51. The wireless communication component 51 enables at least one type of wireless connection to some other wireless communication component. The positioning server 50 further comprises a processing component 53, which is configured to perform a mobile RTK positioning and an extrapolation or interpolation.

For a mobile RTK positioning, the GNSS receivers 32, 42 of both mobile assemblies 30, 40 perform measurements on at least two received satellite signals with a frequency of 1 Hz. During these measurements, the GNSS receiver 42 of the first assembly 40 may be kept at a fixed position, while the GNSS receiver 32 of the second assembly 30 is free to move. The data resulting in the measurements are transmitted by the respective wireless communication component 31, 41 to the positioning server 50. The data that is transmitted may be the same as the data that is determined in steps 112 and 122 of FIG. 3.

The positioning server 50 receives data resulting from GNSS measurements from both mobile assemblies 30, 40 with a frequency of 1 Hz via its wireless communication component 51. The processing component 53 interpolates or extrapolates the data to obtain additional data as described above with reference to step 114 of FIG. 3. The expanded amount of data may then be employed by the processing component 53 to determine positions of the GNSS receiver 32 of the second mobile assembly 30 as described above with reference to step 116 of FIG. 3.

The determined positions can be transmitted for instance to one or both of the mobile assemblies 30, 40 via the wireless communication component 51.

Figure 5:
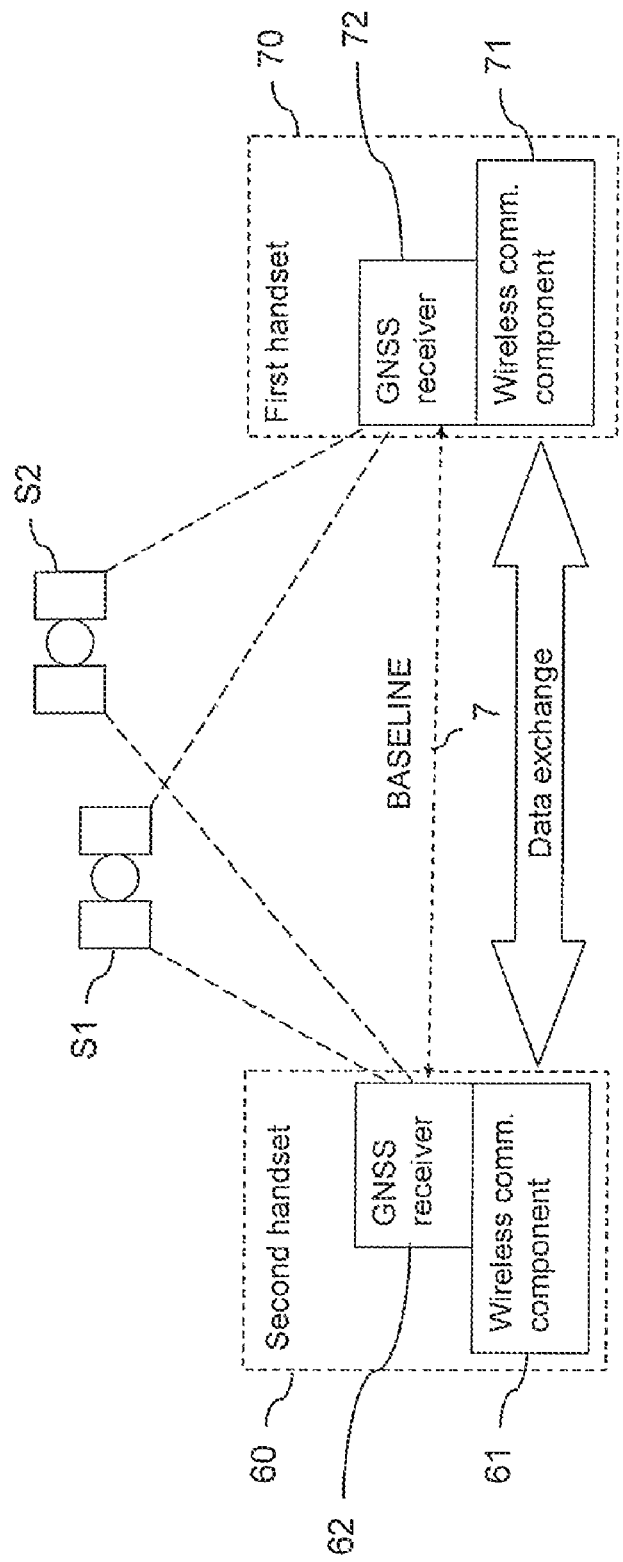
FIG. 5 is a schematic diagram of a system according to a still further embodiment of the invention.

FIG. 5 presents yet another exemplary system according to the invention, which allows determining a relative position with a high precision using a low bandwidth.

This system comprises a first mobile handset 60 as a first assembly according to an embodiment of the invention and a second mobile handset 70 as a second assembly according to an embodiment of the invention.

Both handsets 60, 70 include a wireless communication component 61, 71 and a GNSS receiver 62, 72. The wireless communication components 61, 71 enable at least one type of wireless connection among each other. The GNSS receivers 62, 72 are able to receive signals which are transmitted by satellites S1, S2 belonging to one or more GNSSs. They are separated from each other by baseline 7.

The wireless communication component 61, 71 of both handsets 60, 70 includes a processor corresponding to processor 13 of FIG. 2 (not shown), which is configured to executed software program code corresponding to mobile RTK positioning software program code 14 and an extrapolation or interpolation software program code 15 of FIG. 2.

An operation in the system of FIG. 5 may correspond to the operation described above with reference to the flow chart of FIG. 3, in which an arbitrary one of the handsets 60, 70 takes the role of the mobile assembly 10, while the respective other handset 70, 60 takes the role of the base station 20. Further, both handsets 60, 70 could also operate as "mobile assembly 10" in this setup. This implies for example that both could receive a set of data from the respective other handset 70, 60 for performing its own positioning calculations.

In all presented embodiments, the amount of data that is transmitted is kept low, such that a low bandwidth is required. Still, the precision that is achieved when tracking a position is increased by providing an increased amount of data on which the relative positioning can be based.

Figure 1:
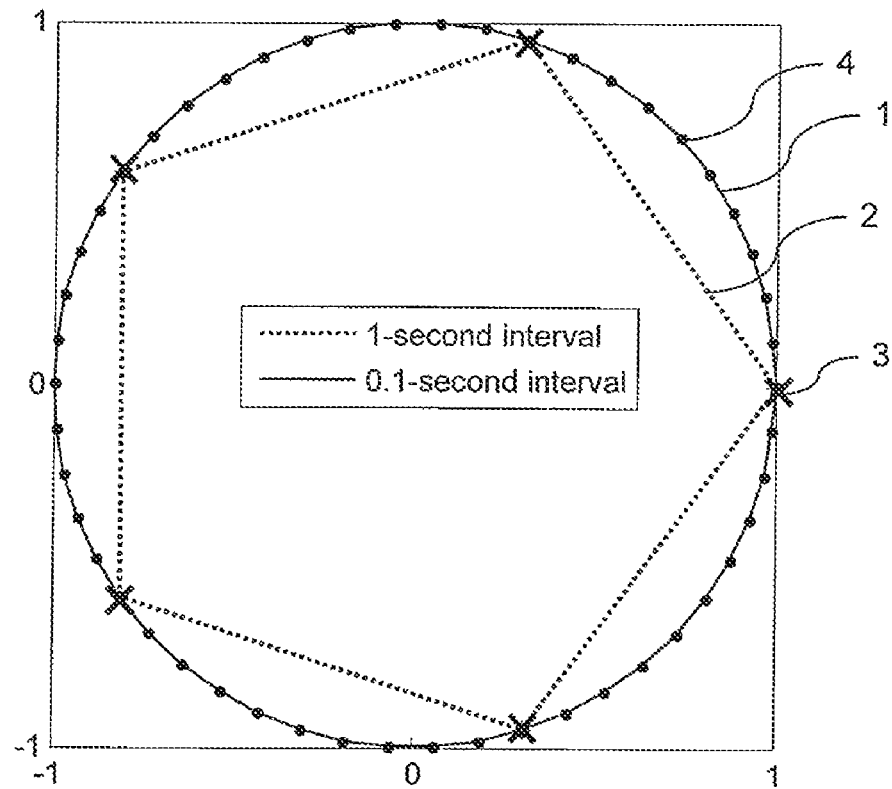
FIG. 1 is a diagram illustrating the effect of the update frequency on an RTK positioning.

The processor 13 of FIG. 1 and the processing component 53 of FIG. 4 may belong to an exemplary apparatus according to the invention. Such an apparatus can be arranged at different places of a system, for instance in a user assembly 10, 60, 70 or in a server 50. Also within a user assembly, there are different possibilities of arranging the apparatus.

FIGS. 6A to 6E illustrate some exemplary options of arranging an apparatus according to an embodiment of the invention in an assembly. The apparatus comprises a processing component, which can be implemented in hardware and/or software, and which is configured to increase an available amount of data, for instance as described above with reference to steps 113 and 114 of FIG. 3.

Figure 6C:
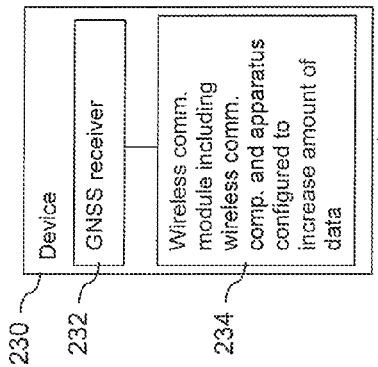
FIGS. 6A-E are schematic diagrams of exemplary alternatives of distributing an apparatus according to an embodiment of the invention in an assembly.
Figure 6B:
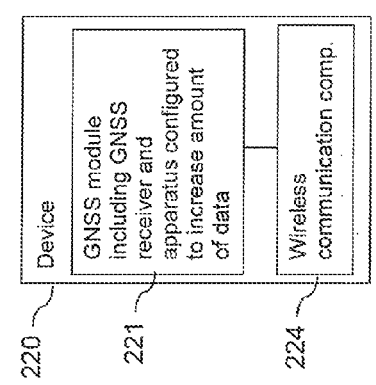
Figure 6A:
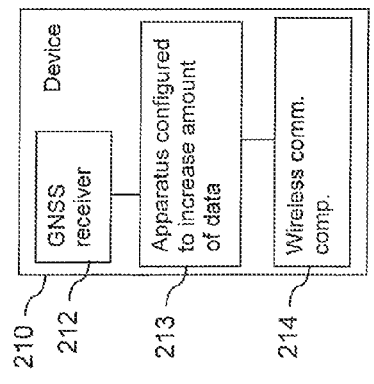

In FIG. 6A, the assembly is a single device 210, like a handset. It comprises the second GNSS receiver 212 according to an embodiment of the invention, a wireless communication component 214 and an apparatus 213. In this embodiment, the apparatus 213 is or belongs to a different module than the GNSS receiver 212 and the wireless communication component 214.

In FIG. 6B, the assembly is again a single device 220. In this case, it comprises a GNSS module 221, including the second GNSS receiver and the apparatus. The device 220 further includes a separate wireless communication component 224.

In FIG. 6C, the assembly is again a single device 230. In this case, it comprises the second GNSS receiver 232 and a wireless communication module 234. The wireless communication module 234 includes the apparatus and a wireless communication component.

Figure 6E:
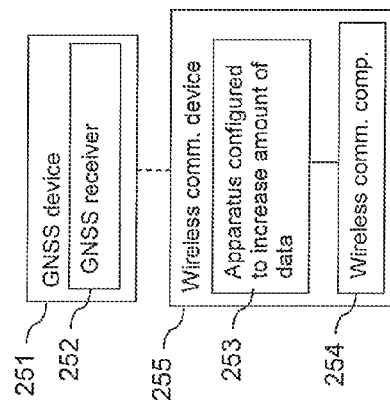
Figure 6D:
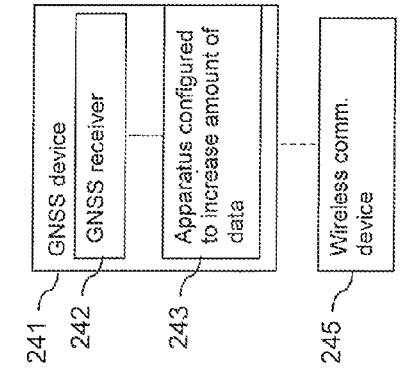

In FIG. 6D, the assembly is distributed to several devices. It comprises a GNSS device 241, including the second GNSS receiver 242 and the apparatus 243. The assembly further includes a separate wireless communication device 245. The GNSS device 241 can be linked to the wireless communication device 245 by means of any suitable wired or wireless technology.

In FIG. 6E, the assembly is distributed again to several devices. It comprises a GNSS device 251 and a separate wireless communication device 255. The GNSS device 251 includes the second GNSS receiver 252. The wireless communication device 255 includes the apparatus 253 and a wireless communication component 254. The GNSS device 251 can be linked to the wireless communication device 255 by means of any suitable wired or wireless technology.

Figure 7:
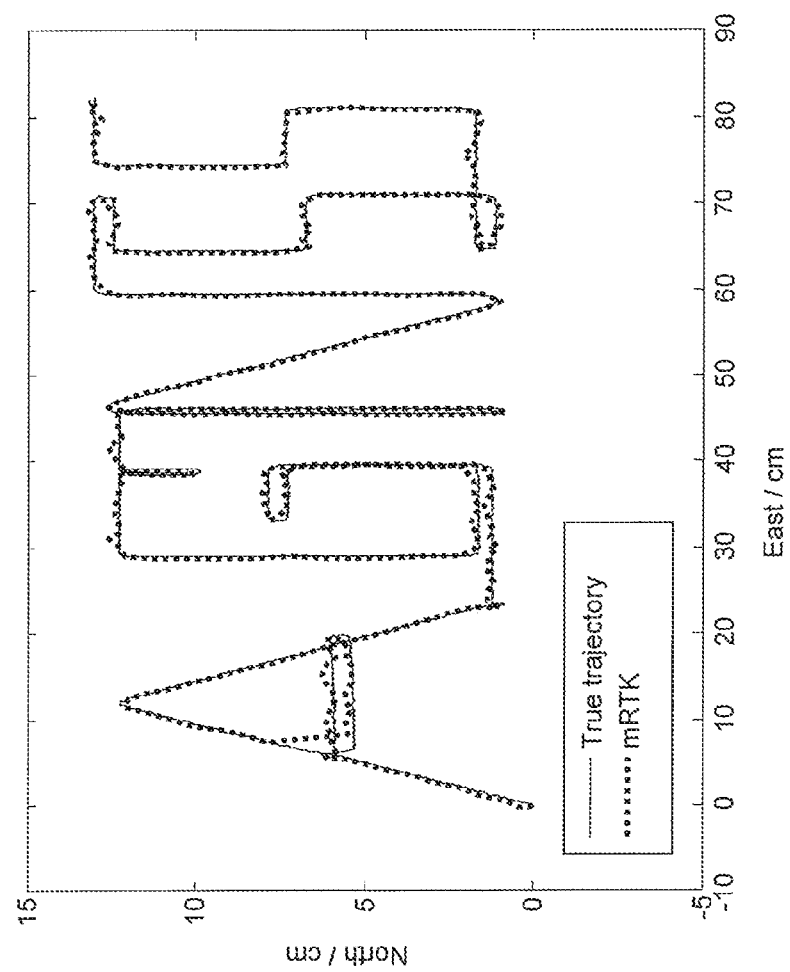
FIG. 7 is a diagram illustrating the accuracy of mRTK.

FIG. 7 is a diagram illustrating the general suitability of mobile RTK positioning for the detection of movement on a small scale. The diagram is a coordinate system, in which the x-axis represents the East direction and the y-axis represents the North direction. A path indicated by a thin solid line has been followed by moving a user receiver relative to a reference receiver. The reference receiver has been kept at a fixed position. A thicker dotted line indicates the trajectory that has been determined using a carrier-phase based positioning. It becomes apparent how well the measured trajectory describes the true path when considering that the scale of the diagram is in centimeters. While the diagram has been generated by moving a conventional mobile RTK receiver very slowly, it can be expected that a similar trajectory will be obtained with a fast moving mobile RTK receiver using an artificially increased amount of data in accordance with the invention.

The functions illustrated by the processor 13 and the processing component 53 can also be viewed as means for receiving at least one set of data on satellite signals from at least one first assembly, each received set of data being associated to a particular instant of time. Alternatively, the functions illustrated by the cellular phone component 11 and the wireless communication component 51 could be viewed as such means for receiving at least one set of data on satellite signals from at least one first assembly. The functions illustrated by the processor 13 and the processing component 53 can further be viewed as means for estimating data for at least one additional set of data associated to a respective additional instant of time based on the at least one received set of data. The functions illustrated by the processor 13 and the processing component 53 can further be viewed as means for providing data from the at least one additional set of data in addition to data from the at least one received set of data for a determination of a position of at least one second assembly relative to a position of the at least one first assembly.

Such means, however, are to be understood to cover the structures described herein as performing the recited function and not only structural equivalents, but also equivalent structures.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A method comprising:
receiving, by an assembly, sets of data on satellite signals from at least one first global navigation satellite system receiver external to the assembly at a first rate, each received set of data being associated with a particular instant of time, wherein the assembly comprises at least one second global navigation satellite system receiver;

estimating, by the assembly, data for additional sets of data associated with a respective additional instant of time based on said received sets of data;

providing data from said additional sets of data in addition to data from said received sets of data for a determination of a position of said at least one second global navigation satellite system receiver relative to a position of said at least one first global navigation satellite system receiver; and estimating, by the assembly, data for additional sets of data based on own sets of data, the own sets of data being determined at said first rate based on satellite signals received by said at least one second global navigation satellite system receiver.

2. The method according to claim 1, wherein the estimated data for each of the additional sets of data comprise at least one of a value that is related to a carrier phase of a satellite signal, a value that is related to a code phase of a satellite signal, a value that is related to a pseudorange, and a value that is related to a Doppler frequency.

3. The method according to claim 1, wherein a stationary assembly comprises said at least one first global navigation satellite system receiver.

4. The method according to claim 1, wherein said estimating of data for additional sets of data comprises at least one of:
extrapolating selected data from at least one received set of data according to a rate of change of said selected data, which rate of change is determined from a value from said at least one received set of data; and
interpolating selected data from at least two received sets of data according to a rate of change of said selected data, which rate of change is determined from a value from each of said at least two received sets of data.

5. The method according to claim 4, wherein each received set of data comprises a value indicating by itself a Doppler frequency, and wherein said rate of change is determined from said value in at least one received set of data.

6. An apparatus comprising software program code and a processor, the software program code configured to, with the processor, cause an assembly to perform the following:
receive sets of data relating to satellite signals from at least one first global navigation satellite system receiver external to said assembly at a first rate, each received set of data being associated with a particular instant of time, wherein the assembly comprises at least one second global navigation satellite system receiver;
estimate data for additional sets of data associated with a respective additional instant of time based on said received sets of data;
provide data from said additional sets of data in addition to data from said received sets of data for a determination of a position of said at least one second global navigation satellite system receiver relative to a position of said at least one first global navigation satellite system receiver; and
estimate data for additional sets of data based on own sets of data, the own sets of data being determined at said first rate based on satellite signals received by said at least one second global navigation satellite system.

7. A module comprising
an apparatus according to claim 6; and
a global navigation satellite system receiver configured to receive signals from at least one satellite.

8. A global navigation satellite system device comprising an apparatus according to claim 6; and
a global navigation satellite system receiver configured to receive signals from at least one satellite.

9. A wireless communication device comprising an apparatus according to claim 6; and
a wireless communication component configured to receive measurement results on satellite signals from said at least one first global navigation satellite system receiver.

10. An assembly comprising
an apparatus according to claim 6;
a global navigation satellite system receiver configured to receive signals from at least one satellite; and
a wireless communication component configured to receive measurement results on satellite signals from said at least one first global navigation satellite system receiver.

11. A server comprising an apparatus according to claim 6 and a wireless communication component configured to receive measurement results on satellite signals from said at least one first global navigation satellite system receiver and from said at least one second global navigation satellite system receiver.

12. The apparatus according to claim 6, wherein the estimated data for each of the additional sets of data comprise at least one of a value that is related to a carrier phase of a satellite signal, a value that is related to a code phase of a satellite signal, a value that is related to a pseudorange, and a value that is related to a Doppler frequency.

13. The apparatus according to claim 6, wherein the software program code is configured to, with the processor, cause the assembly to
estimate data for additional sets of data associated with a respective additional instant of time based on said at least one received set of data by at least one of:
extrapolating selected data from at least one received set of data according to a rate of change of said selected data, which rate of change is determined from a value from said at least one received set of data; and
interpolating selected data from at least two received sets of data according to a rate of change of said selected data, which rate of change is determined from a value from each of said at least two received sets of data.

14. The apparatus according to claim 13, wherein each received set of data comprises a value indicating by itself a Doppler frequency, and wherein the software program code is configured to, with the processor, cause the assembly to determine said rate of change from said value in at least one received set of data.

15. Apparatus according to claim 6, wherein said apparatus is one of
a global navigation satellite system device;
a wireless communication device; and
a handset.

16. A computer readable medium stored with software program code, said software program code causing an assembly to perform the following when executed by a processor:
receiving sets of data on satellite signals from at least one first global navigation satellite system receiver external to the assembly at a first rate, each received set of data being associated with a particular instant of time, wherein the assembly comprises at least one second global navigation satellite system receiver;
estimating data for additional sets of data associated with a respective additional instant of time based on said received sets of data; and
providing data from said additional sets of data in addition to data from said received sets of data for a determination of a position of said at least one second global navigation satellite system receiver relative to a position of said at least one first global navigation satellite system receiver; and estimating data for additional sets of data based on own sets of data, the own sets of data being determined at said first rate based on satellite signals received by said at least one second global navigation satellite system receiver.

17. An apparatus comprising:

means for receiving sets of data relating to satellite signals from at least one first global navigation satellite system receiver external to an assembly comprising the apparatus at a first rate, each received set of data being associated with a particular instant of time, wherein the assembly comprises at least one second global navigation satellite system receiver;

means for estimating data for additional sets of data associated with a respective additional instant of time based on said received sets of data, in order to be able to provide data from said additional sets of data in addition to data from said received sets of data for a determination of a position of said at least one second global navigation satellite system receiver relative to a position of said at least one first global navigation satellite system receiver; and means for estimating data for additional sets of data based on own sets of data, the own sets of data being determined at said first rate based on satellite signals received by said at least one second global navigation satellite system receiver.

18. The apparatus according to claim 17, further comprising means for handling a wireless communication with another apparatus.

* * * * *